United States Patent [19]
Lake

[11] Patent Number: 5,493,483
[45] Date of Patent: Feb. 20, 1996

[54] LAMP REFLECTORS AND UV CURABLE COMPOSITIONS USEFUL AS BASECOATS FOR SAME

[75] Inventor: Randall T. Lake, Newburgh, Ind.

[73] Assignee: Red Spot Paint & Varnish Co., Inc., Evansville, Ind.

[21] Appl. No.: 90,706

[22] Filed: Jul. 13, 1993

[51] Int. Cl.⁶ .................................................. F21V 7/00
[52] U.S. Cl. .......................... 362/346; 362/297; 362/341; 359/884
[58] Field of Search ........................... 362/61, 296, 310, 362/347, 348, 346, 297, 341; 359/884; 428/483, 461

[56] References Cited

U.S. PATENT DOCUMENTS

| | | | |
|---|---|---|---|
| 4,128,600 | 12/1978 | Skinner et al. | 528/75 X |
| 4,148,967 | 4/1979 | Satoh et al. | 428/416 |
| 4,351,018 | 9/1982 | Fratty | 362/215 |
| 4,387,204 | 6/1983 | Zahir et al. | 526/249 |
| 4,393,187 | 7/1983 | Boba et al. | 528/60 |
| 4,463,169 | 7/1984 | Irving | 528/376 |
| 4,511,596 | 4/1985 | Berner | 427/44 |
| 4,607,084 | 8/1986 | Morris | 525/454 |
| 4,704,661 | 11/1987 | Kosmatka | 362/61 |
| 4,900,763 | 2/1990 | Kraushaar | 522/14 |
| 5,034,867 | 7/1991 | Mayer | 367/297 |
| 5,072,348 | 12/1991 | Tsukada | 362/61 X |
| 5,149,592 | 9/1992 | Wojnarowicz | 428/447 |
| 5,171,624 | 12/1992 | Walter | 428/156 |
| 5,175,030 | 12/1992 | Lu et al. | 428/30 |
| 5,183,831 | 2/1993 | Bielat et al. | 522/33 |

OTHER PUBLICATIONS

McConnell et al., "Chapter 20, Structure–Performance Relationships of Urethane Acrylates", Rad. Curing of Polymeric Materials, pp. 272–283.
Miller, "Acrylourethane Resin Design", *Radiation Curing*, pp. 4–9 (1984).
Roffey, "Chapter 3, Photo–Initiators and Photo–Sensitizers", *Photopolymerization of Surface Coatings*.

Primary Examiner—Stephen F. Husar
Attorney, Agent, or Firm—Woodard, Emhardt, Naughton, Moriarty & McNeil

[57] ABSTRACT

Described are preferred UV curable coating compositions which are suitable for use as basecoats in the production of lamp reflectors. Also described are reflector devices and methods for making them.

12 Claims, 1 Drawing Sheet

LAMP REFLECTORS AND UV CURABLE COMPOSITIONS USEFUL AS BASECOATS FOR SAME

BACKGROUND OF THE INVENTION

The present invention relates generally to ultraviolet (UV) curable coating compositions and their use as basecoats on metallized molded plastic articles such as lamp reflectors.

As further background, metallized plastic molded articles are multi-layer structures which include a molded substrate, a basecoat on the substrate, and a metal film adhered to the basecoat. Further, metallized plastic molded articles may include one or more additional coatings on top of the metal film, for example, they may simply include a topcoat or may include an interlayer and a topcoat.

The basecoat is a highly important component of metallized molded plastic articles. The basecoat must adhere well to the plastic substrate and to the metal film. Additionally, the basecoat must be of a uniform thickness across the coated area of the substrate in order to provide a smooth, lusterous appearance to the metallized article and, in the case of metallized articles having exacting optical standards, e.g. reflectors, to preserve the intended optics of the final device. A problem which has been encountered in the prior art is that basecoats have not possessed good edge-coating or leveling properties. Rather, basecoats used in the past have tended to draw or creep away from edges of the substrate thus leaving only a thin coating or no coating near the substrate edges, or have tended to gather at edges and cure to form an undesired ridge or raised portion. In the case of automobile lamp reflectors, this problem has hampered the production of quality, substantially smooth-surfaced reflectors which are used in conjunction with lenses which contain optical structure to achieve appropriate distribution of light.

Moreover, a trend exists in the automobile industry to eliminate optical structures from headlamp lenses and rather build them into the associated reflectors. Such reflectors having built-in optical structures include, for example, fluted and/or faceted reflectors (see for instance U.S. Pat. Nos. 4,704,661 and 5,034,867). Fluted reflectors include a plurality of convex flutes which introduce alternating grooves and ridges or humps within the reflector surface. Faceted reflectors have a plurality of discreet reflective surfaces which introduce grooves and/or edges between the discreet surfaces. Basecoats having poor edge-coating and leveling properties present special problems with such optical reflectors because thinning or gathering on or between their structural features interferes with the intended optics.

Basecoats on metallized plastic molded articles, especially in the case of lamp reflectors, must also exhibit superior thermal stability. Generally, in testing, such basecoats must form stable substrates for the metal film, and the resulting reflectors must exhibit no change in appearance (generally no thermal blistering, cracking or hazing) when subjected to a minimum of 350° F. for two hours. In the case of lamp reflectors formed from bulk molding compound ("BMC"—glass-reinforced unsaturated polyester resin compositions typically containing up to about 30 wt. % or more glass fibers, e.g. 10%–30%), achieving these aims has been difficult since coatings which are thermally stable have not adhered at all well to the BMC surface.

A need therefore exists for UV curable compositions which are useful as basecoats for metallized molded plastic articles and which exhibit superior flow properties with respect to edge-coating and leveling, and which form cured coatings which adhere well and exhibit thermal stability. The present invention addresses these needs.

SUMMARY OF THE INVENTION

The present invention encompasses metallized plastic molded articles such as lamp reflectors, and UV curable compositions which form superior basecoats for such metallized plastic molded articles. The metallized plastic molded articles are provided with adherent UV-cured basecoats which comprise an acrylated or methacrylated polyester urethane and possess superior thermal stability, avoiding blistering, cracking or hazing upon extended exposure to heat conditions even well above present industry standards. Moreover, the provided coating compositions have excellent flow properties onto the articles so as to form cured basecoats of substantially uniform thickness including at edges or built-in utilitarian (e.g. optical) structures of the articles.

Accordingly, one preferred embodiment of the invention provides a lamp reflector. The reflector comprises a reflector body or housing formed from glass-reinforced unsaturated polyester resin (BMC). The reflector body has an area, usually generally parabolic in shape, on which to form a reflective coating, and at least one aperture defined in the area for receiving a bulb. In accordance with the invention the reflector also includes a basecoat adhered to the area, which basecoat comprises an acrylated or methacrylated polyester urethane (i.e. a polyester urethane acrylate or methacrylate oligomer), and a metal film adhered to the basecoat so as to form a reflector surface.

A second preferred embodiment of the invention provides a UV curable coating composition which is suitable for forming a basecoat for a metallized plastic molded article. The composition of this embodiment comprises a solvent, and, exclusive of the solvent (i.e. not taking into account the weight of the solvent), about 10% to about 20% of an acrylated or methacrylated polyester urethane having a number average molecular weight of about 500 to about 2000, about 40% to about 60% of trifunctional acrylate, about 5% to about 15% of an epoxy diacrylate, and about 3% to about 15% of a photoinitiator. Typically, the solvent will constitute about 75% to about 45% of the overall composition and, taken together, the acrylated or methacrylated polyester urethane, trifunctional acrylate, epoxy diacrylate and photoinitiator will constitute about 25% to about 55% of the overall composition. Such compositions have good leveling and edge-coating properties, and upon curing by ultraviolet radiation form photoreaction products having superior hardness and thermal stability.

A third preferred embodiment of the invention provides a further UV curable coating composition suitable for forming a basecoat on a metallized plastic molded article. The composition of this embodiment comprises a solvent and, exclusive of the solvent, about 25% to about 45% of an acrylated or methacrylated polyester urethane having a number average molecular weight of about 500 to about 2000, about 45% to about 65% of a trifunctional acrylate, and about 3% to about 15% of a photoinitiator. As with the second-mentioned embodiment above, the solvent will usually constitute about 75% to about 45% of the overall composition and, taken together, the acrylated or methacrylated polyester urethane, trifunctional acrylate, and photoinitiator will constitute about 25% to about 55% of the overall composition. Such compositions have exceptional flow properties (e.g edge-coating and leveling properties), and form coatings having superior resistance to thermal cracking.

A fourth preferred embodiment of the invention provides a further UV curable coating composition suitable for forming a basecoat on a metallized plastic molded article. This composition comprises a solvent and, exclusive of the solvent, about 15% to about 30% of an acrylated or methacrylated polyester urethane having a number average molecular weight of about 500 to about 2000, about 1% to about 15% of an acrylated or methacrylated polyether urethane having a number average molecular weight of about 1200 to about 2600, about 40% to about 60% of trifunctional acrylate, about 5% to about 15% of an epoxy diacrylate, and about 3% to about 15% of a photoinitiator. As with the second-mentioned embodiment above, the solvent will usually constitute about 75% to about 45% of the overall composition and, taken together, the acrylated or methacrylated polyester urethane, acrylated or methacrylated polyether urethane, trifunctional acrylate, epoxy diacrylate and photoinitiator will constitute about 25% to about 55% of the overall composition. Compositions of this embodiment have good edge-coating and leveling properties, form coatings having superior resistance to cracking, and demonstrate superior adhesion to BMC's with high glass content.

A fifth preferred embodiment of the invention provides a further UV curable coating composition suitable for forming a basecoat on a metallized plastic molded article. This composition also comprises a solvent, and, exclusive of the solvent, about 70% to about 90% of an acrylated or methacrylated polyester urethane having a number average molecular weight of about 500 to about 2000, about 3% to about 15% of a photoinitiator, and also about 3% to about 15% of a second acrylated or methacrylated urethane having a molecular weight greater than that of the acrylated or methacrylated polyester urethane, and preferably in the range of about 1500 to about 2500. As with the second-mentioned embodiment above, the solvent will usually constitute about 75% to about 45% of the overall composition and, taken together, the acrylated or methacrylated polyester urethane, second acrylated or methacrylated urethane, and photoinitiator will constitute about 25% to about 55% of the overall composition. Compositions of this embodiment have good flow properties and form coatings demonstrating good thermal stability and adhesion to BMC's with high levels of glass content and crosslinking.

Additional preferred embodiments of the invention provide metallized plastic molded articles which comprise a molded plastic substrate, a UV-cured basecoat adhered to the plastic substrate which is the photoreaction product of any one of the above-defined compositions of the invention, and a metal film adhered to the basecoat.

Still further preferred embodiments of the invention provide methods for making metallized molded plastic articles which comprise providing a molded plastic substrate, coating a surface of the substrate with any one of the above-defined compositions of the invention, flashing the solvent from the composition, curing the composition by the application of ultraviolet light to form a cured basecoat adhered to the surface, and forming a metal film adhered to the basecoat (e.g. by vacuum metallization or sputtering).

It will be understood that the use of numerical designations in connection with the above embodiments (e.g. first preferred embodiment, second preferred embodiment, etc.) does not indicate preference of one embodiment over another, but is only for the sake of convenience. Also, unless otherwise specified, percents set forth in this application are percents by weight.

One object of the invention is to provide ultraviolet curable coating compositions that are suited for forming basecoats for metallized plastic molded articles such as reflectors for vehicle tail lamps, headlamps or foglamps and street or highway lights.

Another object of the invention is to provide UV-curable coating compositions having excellent thermal stability and adhesion to plastics such as BMC.

Another object of the invention is to provide UV-curable coating compositions which have excellent flow properties such as edge-coating and leveling properties.

Another object of the invention is to provide processes for manufacturing metallized molded plastic articles such as automobile lamp reflectors, which involve the use of UV curable compositions that are easy to process and give superior coatings.

Still another object of the present invention is to provide coated molded plastic substrates, wherein the coating is a UV-cured coating that is smooth and uniform, including at edges or utilitarian structural features of the substrate.

Further objects and advantages of the present invention will be apparent from the following description and appended claims.

DESCRIPTION OF PREFERRED EMBODIMENTS

Figure 1:
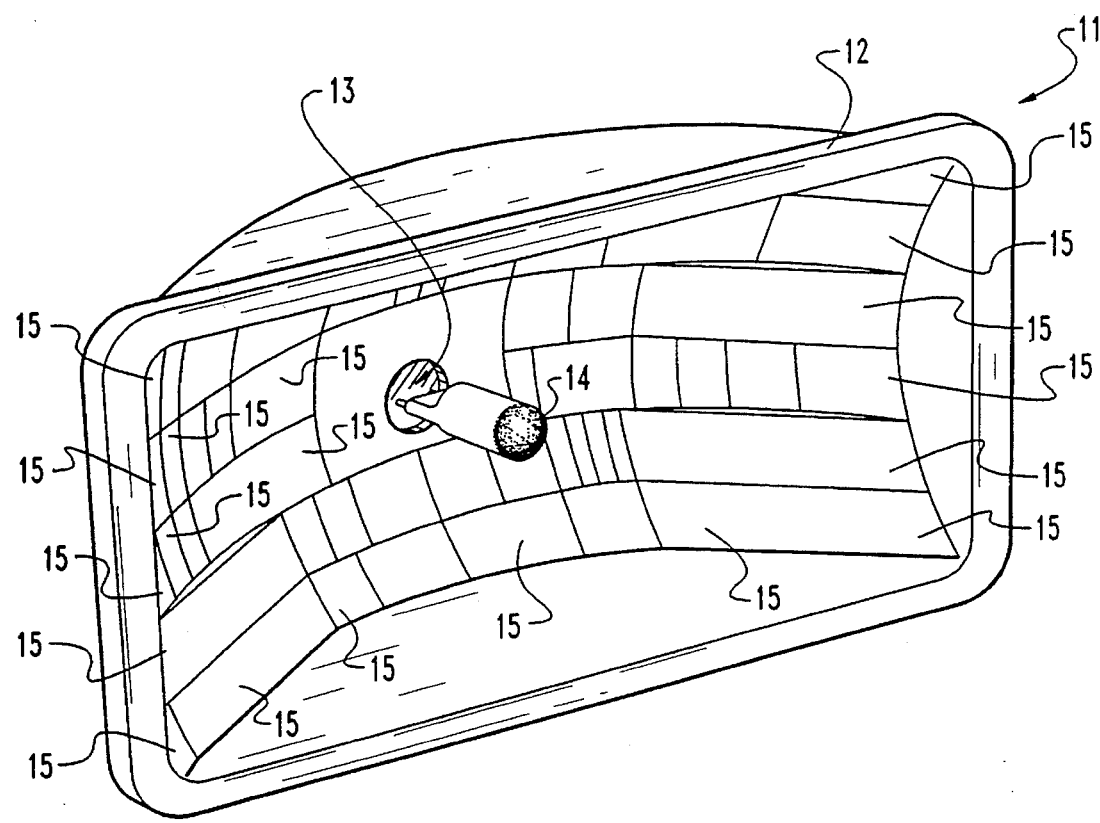
FIG. 1 provides a perspective view of a faceted lamp reflector in accordance with the present invention.

For the purposes of promoting an understanding of the principles of the invention, reference will now be made to certain embodiments and specific language will be used to describe the same. It will nevertheless be understood that no limitation of the scope of the invention is thereby intended, such alterations, further modifications and applications of the principles of the invention as described herein being contemplated as would normally occur to one skilled in the art to which the invention relates.

As indicated above, preferred embodiments of this invention relate to UV curable coating compositions which comprise an acrylated or methacrylated polyester urethane and are suited for use to form basecoats on metallized molded plastic articles such as lamp reflectors. In this regard, it is important that basecoats on reflectors do not interfere with the intended optics of the reflectors. Thus, the presence of imperfections or bumps in the basecoated reflector can result in parts unsuitable for use, wasting valuable materials and production capacity. The compositions of the present invention provide improved smooth, uniform, adherent and thermally stable coatings, and are thus advantageous for forming basecoats for reflectors such as automobile lamp reflectors.

Compositions of the second-mentioned embodiment above requisitely include an epoxy diacrylate (and optionally a tetrafunctional acrylate) in combination with the acrylated or methacrylated polyester urethane, which combination gives high crosslink density and provides uniform coatings of exceptional hardness and superior resistance to thermal cracking. Compositions of the third-mentioned embodiment do not require the inclusion of the epoxy diacrylate, and have increased levels of trifunctional acrylate, to provide coatings having acceptable hardness and superior resistance to thermal cracking. Compositions of the fourth-mentioned embodiment include a combination of acrylated urethanes in addition to an epoxy diacrylate to provide coatings of acceptable hardness and which have highly superior edge-coating and leveling properties in addition to excellent resistance to thermal cracking. Compositions of the fourth embodiment do not as a requisite include multifunctional acrylates and in addition to having excellent adhesion to highly crosslinked BMC surfaces such as those found on Menzolite, form coatings demonstrating good thermal resistance.

As indicated, compositions of the invention will be comprised about 75% to about 45% of inert solvent. This solvent may be a single solvent type or may be a mixture of solvent types. Suitable solvent types include, for example, ester solvents, e.g. ethyl acetate, butyl acetate, and the like, ketone solvents, e.g. acetone, methylisobutylketone, methylethylketone, and the like, alcohols, e.g. butyl alcohol, isopropanol, and the like, and aromatic solvents, e.g. toluene, xylene, and the like. The amount and types of solvents included will vary in accordance with the particular application at hand. For instance, for spray applications, higher levels of solvent will typically be included, while for flow applications, lower levels of inert solvent will be employed.

Some preferred compositions of the invention include a substantial proportion of a trifunctional acrylate, that is, a compound having three acrylate functionalities. Representative trifunctional acrylates include pentaerythritol triacrylate (PETA), trimethylolpropane triacrylate (TMPTA), and the like. It has been found that trifunctional acrylates provide optional crosslinking properties without forming coatings which are too brittle, as occurs when large amounts of tetra- or greater functional acrylates are included, or which are thermally instable and lack sufficient crosslink density, as occurs when large amounts of difunctional acrylate are used instead of trifunctional acrylate. As such, for all compositions of the invention including trifunctional acrylate, it is preferred that the amount of trifunctional acrylate present equal or exceed the amount of all other multifunctional acrylates combined (on a weight basis).

Other representative multifunctional acrylates which may be included in compositions of the invention include tetraethyleneglycol diacrylate, pentaerythritol tetra acrylate, ethylene glycol di(meth)acrylate, 1,6-hexanediol diacrylate, pentaerythritol tetra acrylate, and the like. Compositions of the invention may also include a molecule having both acrylate and epoxy functionality. For example, epoxy diacrylates can be used (e.g. as required in the second- and fourth-mentioned embodiments above). Representative epoxy diacrylates include Bisphenol A epoxy diacrylate oligomers available from Radcure Specialities under the names Ebecryl 3700 or Ebecryl 3700-20T (the latter being an 80/20 mixture of the oligomer with TMPTA), Ebecryl 3702, or Ebecryl 3703. When included, the epoxy diacrylate provides increased crosslink density and surface hardness to coatings of the invention.

Compositions of the invention include an acrylated or methacrylated polyester urethane, and some also include an acrylated or methacrylated polyether urethane (e.g. as required in the fourth-mentioned embodiment above). In general, in accordance with the present invention, the acrylated polyester or polyether urethanes are preferred. In this regard, as is well known, acrylated and methacrylated urethanes are based on polyether polyols or polyester polyols. Generally, acrylated or methacrylated urethanes are prepared by reacting a diisocyanate, a polyether or polyester polyol, and a hydroxy-terminated acrylate or methacrylate. For example, the polyol can first be reacted with the diisocyanate to form an isocyanate-terminated urethane. The isocyanate-terminated urethane can then be reacted with the hydroxy-terminated acrylate or methacrylate to form the acrylated or methacrylated urethane.

In general, the diisocyanate used in the preparation of the acrylated or methacrylated urethane will comprise at least one carbocycle. Representative diisocyanates thus include dicyclohexyl methane-4,4'-diisocyanate (HMDI), isophorone diisocyanate (IPDI), toluene-diisocyanate (TDI), diphenylmethane 4,4'-diisocyanate (MDI), and the like. Diisocyanates including one or more aliphatic carbocycles or alkyl carbocycles (i.e. alicyclic groups), such as HMDI and IPDI, are preferred.

The hydroxy-terminated acrylate or methacrylate used to prepare the acrylated or methacrylated urethane may be, for example, hydroxyethyl acrylate, hydroxypropyl acrylate, pentaerythritol triacrylate, diphenyl erythritol tetraacrylate, and trimethylolpropane triacrylate. Preferably, the hydroxy-terminated acrylate or methacrylate has multiple acrylate functionalities, e.g. 2, 3 or 4 acrylate functionalities, with acrylates having 3 or more acrylate functionalities being more preferred. Hydroxy-terminated acrylates or methacrylates containing at least 3 polymerizable unsaturated groups per molecule and further having molecular weights of about 190 to about 500, such as pentaerythritol triacrylate or trimethacrylate, diphenyl erythritol tetraacrylate or tetramethacrylate, and trimethylolpropane triacrylate or trimethacrylate, are more preferred. Preferred resulting acrylated or methacrylated polyester urethanes are at least hexafunctional (i.e. they have at least 6 acrylate groups), and are preferably aliphatic.

The polyester polyol component of the acrylated or methacrylated polyester urethane, in accordance with the present invention, will preferably have a molecular weight such that the overall acrylated or methacrylated urethane has a number average molecular weight of about 500 to about 2000, and more preferably about 800 to about 1000. When an acrylated or methacrylated polyether urethane is used in the invention, the polyether polyol will preferably have a molecular weight such that the number average molecular weight of the acrylated or methacrylated urethane is about 1200 to about 2600, more preferably about 1500 to about 2000. More preferred polyether-based acrylated or methacrylated urethanes are formed by the reaction of a hydroxy-terminated acrylate or methacrylate with a molecular weight of about 110 to about 500 with a polyether-based aliphatic urethane (isocyanate-terminated, of course) and having a molecular weight of about 800 to about 2200. The acrylated or methacrylated polyether urethane can be difunctional or have greater functionality, and is preferably aliphatic.

Additional information on acrylated and methacrylated urethanes is found in Henry C. Miller, Radiation Curing, pp. 4–9 (May 1984); and JoAnn A. McConnell and F. Kurt Willard, Radiation Curing of Polymeric Materials, pp. 272–283 (1990).

As those practiced in these areas will appreciate, many photopolymerization initiators providing good through-cure will be suitable for the invention. These include, for instance, photoinitiators known as Irgacure 651 (2,2-dimethoxy-2-phenol-acetophenone), Darocure 1173 (2-hydroxy-2-methyl-1-phenyl-propan-1-one) and Darocure 4265 (a 50/50 blend of 2-hydroxy-2-methyl-1-phenyl-propan-1-one and 2,4,6-[trimethylbenzoyldiphenylphosphine] oxide), available from Ciba Geigy.

The photopolymerization initiator will be included in an amount sufficient to obtain the desired cure response. In preferred compositions of the invention, the photopolymerization initiator is included in amounts of about 3% to about 15% by weight based on solids. As indicated, however, the amount of initiator included will vary based upon many factors such as the cure rate and level of crosslink density for metallization desired. For additional information as to photopolymerization initiators, reference can be made to C. G. Roffey, Photopolymerization of Surface Coatings, Chapter 3: "Photoinitiators and photosensitizers", John Wiley & Sons Ltd (1982).

The coating compositions of the invention may also include other conventional additives. For instance, they may contain polymeric or silicone coating surface improvers, flow improvers, dyes, pigments, flatting agents (e.g. wax-coated or non-wax-coated silica or other inorganic materials), anti-foaming agents, light stabilizers, antioxidants, etc. These materials will be included in varying amounts in accordance with the particular use or application desired. When the coating compositions are used as basecoats in the preparation of metallized molded plastic articles, many such additives are of course not necessary. In any event, when compositions of the invention are so used as basecoats, it is important that conventional additives, if included, do not detrimentally interfere with the metallization process.

As to its use, the coating composition can be applied by any conventional coating method as known in the art. When used as a basecoat in the preparation of a metallized article reflector surface, the composition is preferably either sprayor flow-applied, to provide a cured film thickness of about 0.3 to about 1.0 mils, more preferably about 0.5 to about 0.8 mils. Once applied, the solvents are flashed out, for instance with IR (e.g. for about 1 to 3 min.) or with heated air (e.g. for about 3 to about 15 min.), and the coating composition can be cured by irradiation with ultraviolet rays as is known to those skilled in the art. In this regard, the irradiation is continued until curing is complete, with exposure times typically being less than 300 seconds. Curing temperatures can range from room temperature to the heat distortion temperature of the substrate, while curing distances are typically between about 2 and 18 inches from the UV source.

An ultraviolet light source having a wavelength range of between about 1800 Angstroms and 4500 Angstroms is preferred for curing the compositions of the invention. For example, sunlight, mercury lamps, arc lamps, xenon lamps, gallium lamps, and the like may be used, but high pressure or ultrahigh pressure mercury lamps with power outputs of between about 30 W/cm and 400 W/cm provide particularly advantageous rapid cures.

A high pressure mercury lamp having an intensity of about 30 W/cm to 400 W/cm is preferred, for a total exposure of between about 2400 and 16000 mJ/cm$^2$ as measured by a compact radiometer at 60 to 1200 mW/cm$^2$ more preferably about 3000 to about 5000 mJ/cm$^2$. These curing processes provide good through cure and ensure advantageous coatings which demonstrate good thermal crack resistance.

After the coating composition of the invention is cured, in order to form a metallized article, a film of metal, preferably aluminum, is adhered to the cured basecoat composition. This may be conveniently accomplished by coating the basecoat with a deposit of metal by means of vacuum deposition (i.e. by vacuum metallization, sputtering or other suitable methods). Thereafter, one or more additional layers, including a topcoat, can be conventionally applied over the metal film. When used, topcoats are usually about 0.3 to about 0.5 mils in thickness and can be thermally-cured, UV-cured or other conventional topcoat materials.

In accordance with the invention it has also been found that pretreating a plastic surface such as BMC with ultraviolet light provides improved adhesion of compositions of the invention to the surface. When used, pretreatments will generally be for an exposure in the range of 1000 to 10000 mJ/cm$^2$ as measured by compact radiometer, more usually in the range of about 3000 to 6000 mJ/cm$^2$.

Figure 2:
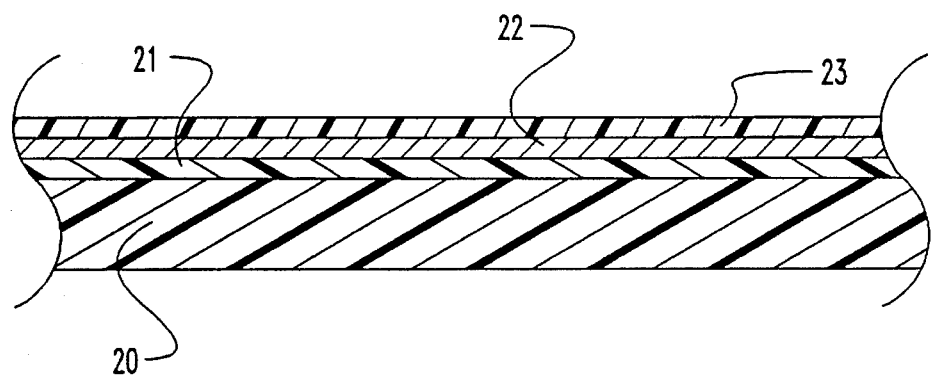
FIG. 2 provides a cross-sectional view of a lamp reflector in accordance with the invention.

In the automobile industry, headlamp reflectors (e.g. 11, FIG. 1), usually having a molded BMC body (12, FIG. 1) with a reflector surface defining an aperture (13, FIG. 1) adapted to receive an incandescent bulb (14, FIG. 1), must have and maintain appropriate optical properties under high heat conditions. The compositions of the invention adhere excellently when cured onto the glass-reinforced unsaturated polyester resins used in such reflector bodies, resist blistering or cracking under high-heat conditions, and are thus well suited for use in the preparation of automobile headlamp reflectors. For example, BMC (20, FIG. 2)/basecoat (21, FIG. 2)/metal film (22, FIG. 2)/topcoat (23, FIG. 2) composites of the invention withstand temperatures of 350° F. for 2 hours without demonstrating loss of reflectivity (i.e. hazing), blistering or loss of adhesion. In fact, preferred multi-layer structures of the invention can withstand temperatures of at least about 400° F. for at least 2 hours (and even up to 24 hours or more) without demonstrating any of these flaws, thus highlighting the superior characteristics of the compositions and articles of the invention.

Reflectors must also have smooth surface characteristics for optimal performance. The UV-cured film must thus be of uniform thickness across the reflector surface so as to avoid the introduction of undesired bumps or undulations which detract from optical properties of the reflector. As noted above, a primary problem of prior art basecoat materials is that they tend to either creep from edges of the reflector and form a cured film that is too thin or non-existent near the edges, or to gather at edges of the reflector so as to form a cured film having an unwanted bump or raised portion near the edge. To the contrary, compositions of the invention have excellent edge-coating and leveling properties; that is, they are drawn to reflector edges and form cured films of uniform thickness, including at the edges.

Thus, not only are compositions of the invention well suited for use as basecoats on standard, smooth-surface reflectors, but also they are particularly advantageous for use on modern reflectors into which optics are built. Such optics typically include a plurality of facets (15, FIG. 1) or convex flutes in the reflector body. To provide suitable optics to the reflector, the basecoat must coat the reflector surface, including utilitarian structural features of the flutes or facets, to a uniform thickness. Basecoats which tend to thin out or gather on or in between the facets or flutes would interfere with the intended optics. The compositions of the present invention, having superior leveling properties, will provide coatings of substantially uniform thickness even across such faceted or fluted reflectors, and are thus especially preferred for use thereon.

For the purposes of promoting a further understanding of the invention and its preferred features and advantages, reference will now be made to the following specific examples. It will be understood that these examples are given by way of illustration and are not restrictive of the invention.

EXAMPLE 1

Coating Composition of Second Embodiment

A UV curable coating composition of the second preferred embodiment of the invention was prepared by blending the ingredients set forth in Table 1 in a clean stainless steel vessel equipped with a stirrer. The acrylated urethane used was Ebecryl 8301, which is a acrylated polyester aliphatic urethane having a number average molecular weight of about 900.

TABLE 1

|  | Part by weight |
| --- | --- |
| Isopropanol | 15.9 |
| Butanol | 31.8 |
| Acrylated urethane | 4.8 |
| TMPTA | 17.9 |
| Ebecryl 3700-20T Epoxy Diacrylate | 3.7 |
| Irgacure 651 Initiator | 3.8 |
| Anti-foaming agent | 0.1 |
| PETA | 6.0 |
| MIBK | 8.0 |
| Butyl Acetate | 8.0 |

EXAMPLE 2

Production of Headlamp Reflector

The coating composition of Example 1 was applied to a glass-reinforced unsaturated polyester (BMC) automobile headlamp reflector body by spray application to allow 0.5 mil (12.5 microns) of cured coating thickness. Thereafter, the material was flashed to remove solvents and irradiated with a high pressure mercury lamp of 120 W/cm$^2$, with the substrate positioned eight inches from the light source for an exposure of about 3400 mJ/cm$^2$ in air.

The thus obtained coated polyester reflector body was then subjected to vacuum metallization using aluminum to achieve a reflective surface, and a 0.5 mil-thick UV-cured topcoat (UVBT 115, Red Spot Paint and Varnish Co, Evansville, Ind.) applied on top of the aluminized surface. The product was subjected to heat treatment in an oven in air at 400° F. for 2 hours. After this period, no blistering, hazing or loss of adherence was noted. Likewise, subjecting the product to heat treatment in an oven in air at 450° F. for 24 hours resulted in no blistering, hazing or adherence problems.

EXAMPLE 3

Coating Material of Second Embodiment

Another UV curable coating composition of the second preferred embodiment of the invention was prepared by blending the ingredients set forth in Table 2 in a clean stainless steel vessel equipped with a stirrer. The acrylated urethane used was again Ebecryl 8301.

TABLE 2

|  | Part by weight |
| --- | --- |
| Acrylated urethane | 4.8 |
| TMPTA | 17.9 |
| Ebecryl 3700-20T Epoxy Diacrylate | 3.7 |
| Irgacure 651 Initiator | 3.8 |
| Anti-foaming agent | 0.1 |
| PETA | 6.0 |
| Butyl Acetate | 63.7 |

EXAMPLE 4

Production of Headlamp Reflector

The coating composition of Example 3 was applied to a glass-reinforced unsaturated polyester (BMC) automobile headlamp reflector body by flow application to allow 0.5 mils of cured coating thickness. Thereafter, the material was flashed of solvents and irradiated with a high pressure mercury lamp of 120 W/cm$^2$, with the substrate positioned eight inches from the light source for an exposure of about 3400 mJ/cm$^2$ in air.

The thus obtained coated polyester reflector body was then subjected to vacuum metallization using aluminum to achieve a reflective surface and topcoated as in Example 2. The product was subjected to heat treatment in an oven in air at 400° F. for 2 hours. After this period, no blistering, hazing or loss of adherence was noted. Likewise, subjecting the product to heat treatment in an oven in air at 450° F. for 24 hours resulted in no blistering, hazing or adherence problems.

EXAMPLE 5

Coating Composition of Second Embodiment

Another UV curable coating composition of the third preferred embodiment of the invention is prepared by blending the ingredients set forth in Table 3 in a clean stainless steel vessel equipped with a stirrer. The acrylated urethane used is Ebecryl 1290.

TABLE 3

|  | Part by weight |
| --- | --- |
| Acrylated urethane | 4.8 |
| TMPTA | 17.9 |
| Ebecryl 3700-20T Epoxy Diacrylate | 3.7 |
| Irgacure 651 Initiator | 3.8 |
| Anti-foaming agent | 0.1 |
| PETA | 6.0 |
| Butyl Acetate | 63.7 |

EXAMPLE 6

Production of Headlamp Reflector

The coating composition of Example 5 is applied to a glass-reinforced unsaturated polyester (BMC) automobile headlamp reflector body by flow application to allow 0.5 mils of cured coating thickness. Thereafter, the material is flashed of sovlents and irradiated with a high pressure mercury lamp of 120 W/cm$^2$, with the substrate positioned eight inches from the light source for an exposure of about 3400 mJ/cm$^2$ in air.

The thus obtained coated polyester lens body is then subjected to vacuum metallization using aluminum to achieve a reflective surface and topcoated as in Example 2.

EXAMPLES 7-10

Additional Coating Compositions of Second Embodiment

Additional coating compositions of the second preferred embodiment are set forth in Table 4 below employing Ebecryl 8301 as the acrylated urethane.

TABLE 4

|  | Ex. 7 | Ex. 8 | Ex. 9 | Ex. 10 |
|---|---|---|---|---|
|  |  | Part by weight |  |  |
| Acrylated urethane | 7.8 | 6.6 | 9.6 | 9.6 |
| TMPTA | 17.9 | 17.9 | 17.9 | 13.1 |
| Ebecryl 3700-20T Epoxy Diacrylate | 3.7 | 1.9 | 1.9 | 3.7 |
| Irgacure 651 Initiator | 3.8 | 3.8 | 3.8 | 3.8 |
| Anti-foaming agent | 0.1 | 0.1 | 0.1 | 0.1 |
| PETA | 3.0 | 6.0 | 3.0 | 6.0 |
| Butyl Acetate | 63.7 | 63.7 | 63.7 | 63.7 |

EXAMPLE 11

Coating Composition of Third Embodiment

A UV curable coating composition of the third preferred embodiment of the invention was prepared by blending the ingredients set forth in Table 5 in a clean stainless steel vessel equipped with a stirrer. The acrylated urethane used was Ebecryl 8301.

TABLE 5

|  | Part by weight |
|---|---|
| Isopropanol | 15.9 |
| Butanol | 31.8 |
| Acrylated urethane | 12.0 |
| TMPTA | 20.4 |
| Irgacure 651 Initiator | 3.8 |
| Anti-foaming agent | 0.1 |
| MIBK | 8.0 |
| Butyl Acetate | 8.0 |

EXAMPLE 12

Production of Headlamp Reflector

The coating composition of Example 11 was applied to a glass-reinforced unsaturated polyester (BMC) automobile headlamp reflector body by flow application to allow 0.5 mils of cured coating thickness. Thereafter, the material was irradiated with a high pressure mercury lamp of 120 W/cm$^2$, with the substrate positioned eight inches from the light source for an exposure of about 3400 mJ/cm$^2$ in air.

The thus obtained coated polyester reflector body was then subjected to vacuum metallization using aluminum to achieve a reflective surface and topcoated as in Example 2. The product was subjected to heat treatment in an oven in air at 350° F. for 2 hours. After this period, no blistering, hazing or loss of adherence was noted. Likewise, subjecting the product to heat treatment in an oven in air at 450° F. for 24 hours resulted in no blistering, hazing or adherence problems.

EXAMPLE 13

Coating Composition of Third Embodiment

A UV curable coating composition of the third preferred embodiment of the invention was prepared by blending the ingredients set forth in Table 6 in a clean stainless steel vessel equipped with a stirrer. The acrylated urethane used was Ebecryl 8301.

TABLE 6

|  | Part by weight |
|---|---|
| Acrylated urethane | 12.0 |
| TMPTA | 20.4 |
| Irgacure 651 Initiator | 3.8 |
| Anti-foaming agent | 0.1 |
| Butyl Acetate | 63.7 |

EXAMPLE 14

Production of Headlamp Reflector

The coating composition of Example 11 was applied to a glass-reinforced unsaturated polyester (BMC) automobile headlamp reflector body by flow application to allow 0.5 mils of cured coating thickness. Thereafter, the material was irradiated with a high pressure mercury lamp of 120 W/cm$^2$, with the substrate positioned eight inches from the light source for an exposure of about 3400 mJ/cm in air.

The thus obtained coated polyester reflector body was then vacuum metallized and topcoated as in Example 2. The product was subjected to heat treatment in an oven in air at 400° F. for 2 hours. After this period, no blistering, hazing or loss of adherence was noted. Likewise, subjecting the product to heat treatment in an oven in air at 450° F. for 24 hours resulted in no blistering, hazing or adherence problems.

EXAMPLES 15-18

Further Coating Compositions of the Third Embodiment

Additional coating compositions of the third preferred embodiment are set forth in Table 7 below. The acrylated urethane is Ebecryl 8301.

TABLE 7

|  | Ex. 15 | Ex. 16 | Ex. 17 | Ex. 18 |
|---|---|---|---|---|
|  |  | Part by weight |  |  |
| Acrylated urethane | 12.1 | 16.7 | 16.2 | 14.1 |
| TMPTA | 20.4 | 28.0 | 16.2 | 18.4 |
| Irgacure 651 Initiator | 3.8 | 3.8 | 3.8 | 3.8 |
| Anti-foaming agent | 0.0 | 0.1 | 0.1 | 0.1 |
| Butyl Acetate | 63.7 | 50.0 | 63.7 | 63.7 |

EXAMPLE 19

Coating Composition of Fourth Embodiment

A UV curable coating composition of the fourth preferred embodiment of the invention was prepared by blending the ingredients set forth in Table 8 in a clean stainless steel vessel equipped with a stirrer. The acrylated polyester urethane used was Ebecryl 8301. The polyether-based acrylated urethane used was AB2010, a difunctional material available from American Biltrite and having a number average molecular weight of about 1850.

TABLE 8

|  | Parts by weight |
| --- | --- |
| Isopropanol | 32.1 |
| Acrylated urethane (polyester) | 9.6 |
| Acrylated urethane (polyether) | 3.4 |
| TMPTA | 16.0 |
| Ebecryl 3700-20T Epoxy Diacrylate | 3.4 |
| Irgacure 651 Initiator | 3.4 |
| Byk 301 Flow Additive | 0.1 |
| MIBK | 16.0 |
| Butyl Acetate | 16.0 |

EXAMPLE 20

Production of Headlamp Reflector

The coating composition of Example 19 was applied to a glass-reinforced unsaturated polyester (BMC) automobile headlamp reflector body by spray application to allow 0.5 mils of cured coating thickness. Thereafter, the material was flashed of solvents and irradiated with a high pressure mercury lamp of 120 W/cm$^2$, with the substrate positioned eight inches from the light source for an exposure of about 3400 mJ/cm$^2$ in air.

The thus obtained coated polyester reflector body was then vacuum metallized and topcoated as in Example 2. The product was subjected to heat treatment in an oven in air at 400° F. for 2 hours. After this period, no blistering, hazing or loss of adherence was noted. Likewise, subjecting the product to heat treatment in an oven in air at 450° F. for 24 hours resulted in no blistering, hazing or adherence problems.

EXAMPLE 21

Coating Composition of Fourth Embodiment

A UV curable coating composition of the fourth preferred embodiment of the invention was prepared by blending the ingredients set forth in Table 9 in a clean stainless steel vessel equipped with a stirrer. The acrylated polyester urethane used was Ebecryl 8301. The polyether-based acrylated urethane used was AB2010 available from American Biltrite, Lawrenceville, N.J.

TABLE 9

|  | Part by weight |
| --- | --- |
| Acrylated urethane (polyester) | 9.6 |
| Acrylated urethane (polyether) | 3.4 |
| TMPTA | 16.0 |
| Ebecryl 3700-20T Epoxy Diacrylate | 3.4 |
| Irgacure 651 Initiator | 3.4 |
| Anti-foaming agent | 0.1 |
| Butyl Acetate | 64.1 |

EXAMPLE 22

Production of Headlamp Reflector

The coating composition of Example 21 was applied to a glass-reinforced unsaturated polyester (BMC) automobile headlamp reflector body by flow application to allow 0.5 mils of cured coating thickness. Thereafter, the material was irradiated with a high pressure mercury lamp of 120 W/cm$^2$, with the substrate positioned eight inches from the light source for an exposure of about 3400 mJ/cm$^2$ in air.

The thus obtained coated polyester reflector body was then vacuum metallized and topcoated as in Example 2. The product was subjected to heat treatment in an oven in air at 400° F. for 2 hours. After this period, no blistering, hazing or loss of adherence was noted. Likewise, subjecting the product to heat treatment in an oven in air at 450° F. for 24 hours resulted in no blistering, hazing or adherence problems.

EXAMPLES 23–26

Additional Coating Compositions of Fourth Embodiment

Additional coating compositions of the fourth preferred embodiment are set forth in Table 10 below. The acrylated polyester urethane used is Ebecryl 8301. The polyether-based acrylated urethane used is AB 2010.

TABLE 10

|  | Ex. 23 | Ex. 24 | Ex. 25 | Ex. 26 |
| --- | --- | --- | --- | --- |
|  | Part by weight | | | |
| Acrylated urethane (polyester) | 9.6 | 9.6 | 9.6 | 13.0 |
| Acrylated urethane (polyether) | 3.4 | 3.4 | 3.4 | 3.4 |
| TMPTA | 16.0 | 12.6 | 12.6 | 12.6 |
| Ebecryl 3700-20T | 3.4 | 3.4 | 6.8 | 6.8 |
| PETA | 0.0 | 3.4 | 0.0 | 0.0 |
| Irgacure 651 Initiator | 3.4 | 3.4 | 3.4 | 3.4 |
| Anti-foaming agent | 0.1 | 0.1 | 0.1 | 0.1 |
| Butyl Acetate | 64.1 | 64.1 | 64.1 | 64.1 |

EXAMPLE 27

Coating Composition of Fifth Embodiment

A UV curable coating composition of the fifth preferred embodiment of the invention was prepared by blending the ingredients set forth in Table 11 in a clean stainless steel vessel equipped with a stirrer. The acrylated polyester urethane used was Ebecryl 8301.

TABLE 11

|  | Parts by weight |
| --- | --- |
| Acrylated urethane (polyester) | 30.5 |
| Acrylated urethane* | 3.4 |
| Irgacure 651 Initiator | 1.4 |
| Irgacure 500 Initiator | 0.7 |
| Butyl Acetate | 64.1 |

*Ebecryl 244 aliphatic urethane diacrylate oligomer (weight average molecular weight 2000) blended with 1,6-hexanediol diacrylate (90/10 by weight, respectively).

EXAMPLE 28

Production of Headlamp Reflector

The coating composition of Example 27 was applied to a glass-reinforced unsaturated polyester (BMC) automobile headlamp reflector body by spray application to allow 0.5 mils of cured coating thickness. Thereafter, the material was flashed of solvents and irradiated with a high pressure mercury lamp of 120 W/cm², with the substrate positioned eight inches from the light source for an exposure of about 3400 mJ/cm² in air.

The thus obtained coated polyester reflector body was then vacuum metallized and topcoated as in Example 2. The product was subjected to heat treatment in an oven in air at 400° F. for 2 hours. After this period, no blistering, hazing or loss of adherence was noted.

While the invention has been illustrated and described in detail in the drawings and foregoing description, the same is to be considered as illustrative and not restrictive in character, it being understood that only the preferred embodiments have been described and that all changes and modifications that come within the spirit of the invention are desired to be protected.

All publications cited herein are hereby incorporated by reference in their entirety as if each was individually incorporated by reference and fully set forth.

What is claimed is:

1. A lamp reflector, comprising:
    a reflector body formed from glass-reinforced unsaturated polyester and having an area on which to form a reflective coating and at least one aperture defined in said area for receiving a lamp bulb;
    a UV-cured basecoat adhered to said area comprising an acrylated or methacrylated polyester urethane; and
    a metal film adhered to said basecoat so as to form a reflector surface.

2. The lamp reflector of claim 1 and also including a topcoat over said metal film.

3. The lamp reflector of claim 2 wherein said reflector surface does not blister, crack or haze when subjected to 350° F. for 2 hours.

4. The lamp reflector of claim 2 wherein said reflector surface does not blister, crack or haze when subjected to 400° F. for 2 hours.

5. The lamp reflector of claim 2 wherein said reflector surface does not blister, crack or haze when subjected to 450° F. for 24 hours.

6. The lamp reflector of claim 1, wherein the UV-cured basecoat comprises about 10% to about 20% of an acrylated or methacrylated polyester urethane having a number average molecular weight of about 500 to about 2000, about 40% to about 60% of trifunctional acrylate, about 5% to about 15% of an epoxy diacrylate, and about 3% to about 15% of a photoinitiator.

7. The lamp reflector of claim 1, wherein the UV-cured basecoat comprises about 25% to about 45% of an acrylated or methacrylated polyester urethane having a number average molecular weight of about 500 to about 2000, about 45% to about 65% of a triacrylate, and about 3% to about 10% of a photoinitiator.

8. The lamp reflector of claim 1, wherein said UV-cured basecoat comprises about 15% to about 30% of an acrylated or methacrylated polyester urethane having a number average molecular weight of about 500 to about 2000, about 1% to about 10% of an acrylated or methacrylated polyether urethane having a number average molecular weight of about 1200 to about 2600, about 40% to about 60% of trifunctional acrylate, about 5% to about 15% of an epoxy diacrylate, and about 3% to about 15% of a photoinitiator.

9. The lamp reflector of claim 1, wherein said UV-cured basecoat comprises about 70% to about 90% of an acrylated or methacrylated polyester urethane having a number average molecular weight of about 500 to about 2000, about 3% to about 15% of a photoinitiator, and about 3% to about 15% of a second acrylated or methacrylated urethane having a molecular weight greater than that of said acrylated or methacrylated polyester urethane.

10. The lamp reflector of claim 1, wherein said reflector surface comprises a plurality of flutes or facets.

11. The lamp reflector of claim 10, wherein said reflector surface comprises a plurality of flutes.

12. A metallized molded plastic article, comprising:
    a molded plastic substrate;
    a UV-cured basecoat comprising an acrylated or methacrylated polyester urethane adhered to said substrate;
    a metal film adhered to said basecoat so as to form a reflector surface; and
    a topcoat over said metal film;
    wherein said reflector surface does not blister, crack or haze when subjected to 350° F. for 2 hours.

* * * * *

UNITED STATES PATENT AND TRADEMARK OFFICE
CERTIFICATE OF CORRECTION

PATENT NO : 5,493,483
DATED : February 20, 1996
INVENTOR(S): Randall T. Lake

It is certified that error appears in the above-identified patent and that said Letters Patent are hereby corrected as shown below:

In col. 7, line 31, please delete "sprayor" and insert in lieu thereof --spray- or--.

Signed and Sealed this

Twenty-ninth Day of May, 2001

*Attest:*

NICHOLAS P. GODICI

*Attesting Officer*     *Acting Director of the United States Patent and Trademark Office*